United States Patent [19]

Uehara

[11] Patent Number: 5,287,045
[45] Date of Patent: Feb. 15, 1994

[54] FULLY DIGITAL APPARATUS FOR CONTROLLING OPERATION OF ELECTRIC MOTOR

[75] Inventor: Soukichi Uehara, Futyu, Japan

[73] Assignee: Kabushiki Kaisha Toshiba, Kawasaki, Japan

[21] Appl. No.: 921,984

[22] Filed: Aug. 3, 1992

Related U.S. Application Data

[63] Continuation of Ser. No. 658,250, Feb. 20, 1991, abandoned.

[30] Foreign Application Priority Data

Feb. 20, 1990 [JP] Japan .................... 2-37210

[51] Int. Cl.$^5$ ............................................. H02P 7/00
[52] U.S. Cl. .................... 318/268; 388/907.5
[58] Field of Search ............. 318/268, 568.11, 568.24, 318/563, 564, 85, 66; 388/907.5, 809; 364/943.9; 371/22.1, 72.6

[56] References Cited

U.S. PATENT DOCUMENTS

| | | | |
|---|---|---|---|
| 3,731,278 | 5/1973 | Eldridge et al. | 364/943.9 |
| 4,168,796 | 9/1979 | Fulks et al. | 371/22.6 |
| 4,196,450 | 4/1980 | Miller et al. | 356/256 |
| 4,370,706 | 1/1983 | Doniger et al. | 318/564 |
| 4,625,156 | 11/1986 | Komiya et al. | 318/85 |
| 4,706,002 | 11/1987 | Fukuyama | 318/568.1 |
| 5,038,089 | 8/1991 | Szakaly | 318/568.11 |

FOREIGN PATENT DOCUMENTS 0077836 5/1982 European Pat. Off. .
2156610 2/1985 United Kingdom .

Primary Examiner—Jonathan Wysocki
Attorney, Agent, or Firm—Oblon, Spivak, McClelland, Maier & Neustadt

[57] ABSTRACT

A digital apparatus for controlling an operation of an electric motor capable of realizing a fully digital speed control without creating a severe restriction on data transfer and an excessive demand on the micro-processor. The apparatus includes a micro-processor for carrying out normal speed control processings at normal speed timings; a high speed digital processor for carrying out high speed control processings at high speed timings faster than the normal speed timings; and interface register for interfacing data transmission between the micro-processor and the high speed digital processor; and a timing circuit for receiving access signals from the micro-processor, and producing timing signals based on the high speed timings by using the access signals where the timing signals control timings of the data transmission through the interface register.

8 Claims, 5 Drawing Sheets

FULLY DIGITAL APPARATUS FOR CONTROLLING OPERATION OF ELECTRIC MOTOR

This application is a Continuation of application Ser. No. 07/658,250, filed on Feb. 20, 1991, now abandoned.

BACKGROUND OF THE INVENTION

1. Field of the Invention

The present invention relates to a digital apparatus for controlling an operation of an electric motor which controls a speed of the electric motor by utilizing digital processings.

2. Description of the Background Art

A use of a micro-computer in the field of controlling has become increasingly popular in conjunction with the development of the micro-computer, because of a capability of a micro-computer to execute a highly complicated controlling, to such an extent by now that it is almost an indispensable aspect of any controlling.

As an example of such a use of a micro-computer in the field of controlling, a conventional digital speed control for an electric motor will now be described by using a case of an electric motor in an elevator system shown in FIG. 1.

An elevator system of FIG. 1 includes a three phase alternating current power supply 41, a converter 42, a direct current smoothing capacitor 43, an inverter 44, a current detector 45, a coil 46, and an inductive motor 47, such that alternating currents supplied by the three phase alternating current power supply 41 are converted into direct currents by the converter 42 first and then converted into alternating currents of variable voltage and variable frequency by the inverter 44 and finally supplied to the inductive motor 47 as a driving power.

The system further includes a rotation angle detector 48 connected to a motor axis of the inductive motor 47 which has a configuration of either a pulse generator or a resolver and which generates a rotation angle detection signal indicating the detected rotation angle, a sheave 49, a counterweight 50 suspended from one end of a rope wound around the sheave 49, and an elevator car 51 suspended from another end of the rope wound around the sheave 49, such that the elevator car 51 is operated by rotating the sheave 49 with the inductive motor 47. The elevator car 51 is equipped with a weight detector 51a for detecting a weight exerted on a floor of the elevator car 51 and generating a weight detection signal indicating the detected weight.

In this system, the controlling of the speed of the elevator car 51 is achieved by appropriately changing a base driving signals to be given to the inverter 44 such that the currents given to the inductive motor 47 can be appropriately adjusted. A system for this controlling will now be described in detail.

Namely, as shown in FIG. 1, a speed detection signal is obtained from the rotation angle detection signal generated by the rotation angle detector 48 at a rotation angle to speed transformation unit 58, and a difference between the obtained speed detection signal and a speed command signal generated by a speed command generation unit 60 is fed to a speed control unit 59. Then, an output of the speed control unit 59 and the weight detection signal generated by the weight detector 51a are fed to a summing unit 57 which outputs a torque command signal, and this torque command signal and the rotation angle detection signal generated by the rotation angle detector 48 are fed to a vector control processing unit 56 which outputs a current command signal for the inductive motor 47. Then, a difference between this current command signal and a current detection signal generated by the current detector 45 is fed to a current control unit 55 which outputs a voltage command signal. This voltage command signal and an output of a carrier triangular wave generator 54 are fed to a comparator 53 which outputs a base signal, and this base signal is fed to a base driver unit 52 which outputs the base driving signal to the inverter 44 such that the inverter 44 adjusts the voltage and frequency of the alternating currents supplied to the inductive motor 47 according to the base driving signal.

In such a conventional speed control system, a part enclosed by a dashed line in FIG. 1 comprises a digital circuit A which is constructed by a micro-processor and IC elements, and both of the running sequence and the protecting sequence are digitally processed by this digital circuit A. Thus, the current command signal outputted from the vector control processing unit 56 is a digital signal which is subsequently converted into an analog signal by using an A/D converter, such that the current control unit 55, the carrier triangular wave generator 54, the comparator 53, and the base driver unit 52 are operated by analog signals.

However, such a conventional speed control system using a current control by analog signals has been associated with problems that an offset and a circuit constant of an operational amplifier element are affected by an environmental temperature and humidity conditions, and that the analog signals are easily affected by external noises. Moreover, a voltage waveform can be distorted when a loop gain is carelessly increased in order to improve a tracking characteristic of the current control, so that there is a limit to the improvement of the tracking characteristic of the current control.

On the other hand, a recent advance of a digital signal processor (DSP) and an application specific integrated circuit (ASIC) which are capable of high speed digital signal processings enabled a realization of the current control with a digital circuit, such that the aforementioned problems associated with the current control with analog signals can be avoided. However, in such a case of fully digital speed control, a processing speed for the current control and speed control must be faster than that of a micro-processor in order to maintain a consistent operation. This implies that the current control and speed control have to be executed according to a high speed clock which is not synchronous with the micro-processor, and there is a need for an interface between the micro-processor and the current control and speed control. This requirement can complicate a configuration of the system considerably, especially when an ample error prevention is to be provided, which in turn causes problems of a severe restriction on data transfer and an excessive demand on the micro-processor.

SUMMARY OF THE INVENTION

It is therefore an object of the present invention to provide a digital apparatus for controlling an operation of an electric motor capable of realizing a fully digital speed control without creating a severe restriction on data transfer and an excessive demand on the microprocessor.

This object is achieved in the present invention by providing an apparatus for controlling an operation of an electric motor, comprising: micro-processor means for carrying out normal speed control processings at normal speed timings; high speed digital processor means for carrying out high speed control processings at high speed timings faster than the normal speed timings; means for controlling the operation of the electric motor according to the normal speed control processings and the high speed control processings; interface register means for interfacing data transmission between the micro-processor means and the high speed digital processor means; and timing circuit means for receiving access signals from the micro-processor means, and producing timing signals based on the high speed timings by using the access signals where the timing signals control timings of the data transmission through the interface register means.

Other features and advantages of the present invention will become apparent from the following description taken in conjunction with the accompanying drawings.

DETAILED DESCRIPTION OF THE PREFERRED EMBODIMENTS

Figure 2:
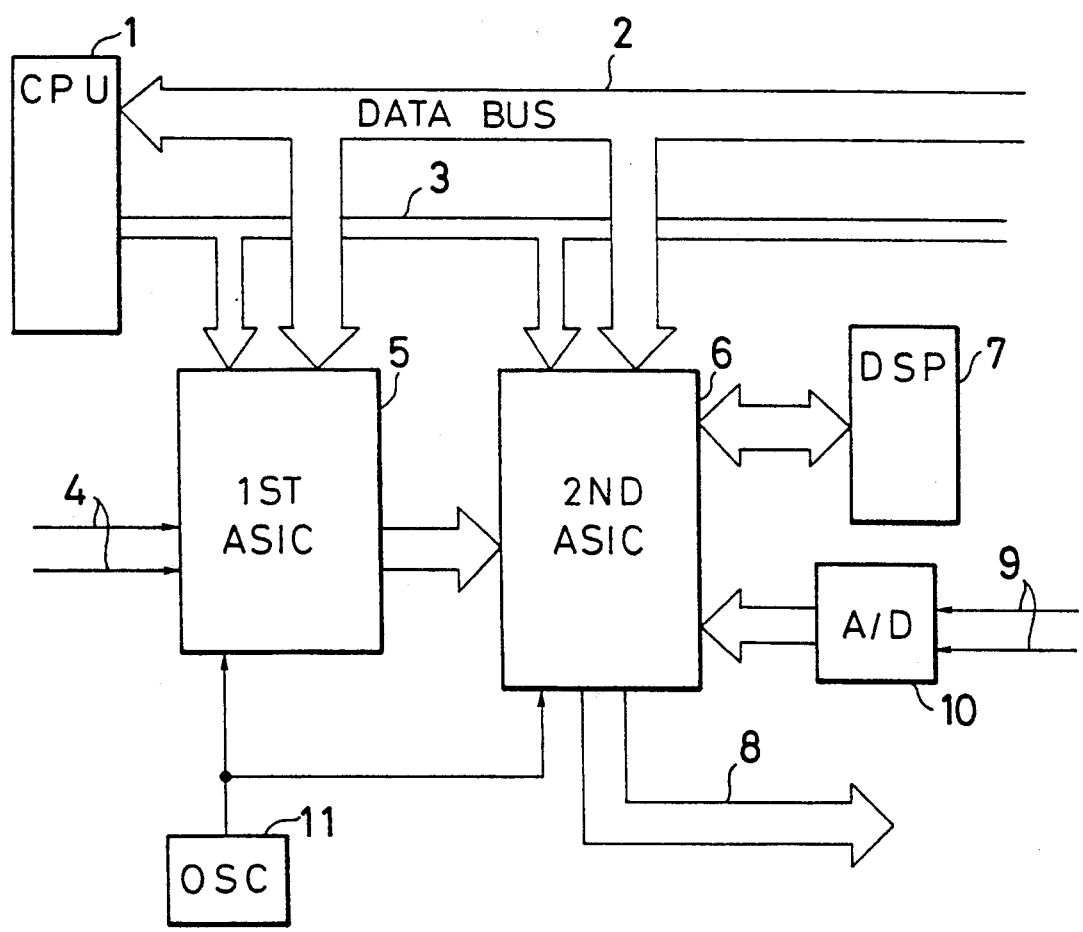
FIG. 2 is a schematic block diagram of one embodiment of a speed control apparatus for an electric motor according to the present invention.

Referring now to FIG. 2, one embodiment of a fully digital speed control apparatus for an electric motor according to the present invention will be described. In this embodiment, the apparatus is adapted to perform functionally the same speed control in an elevator system as that described above as a conventional example.

Figure 1:
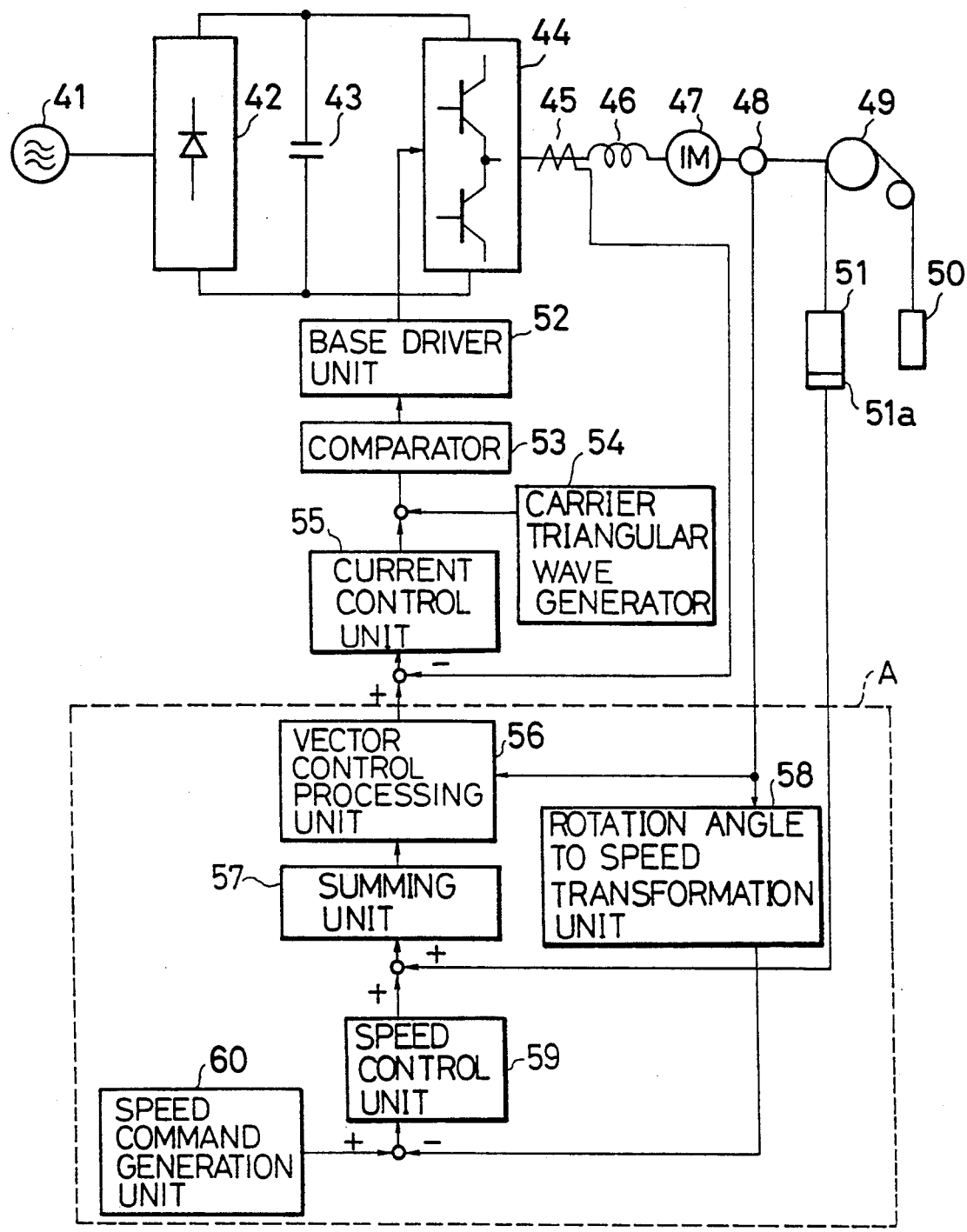
FIG. 1 is a schematic block diagram of an elevator system including a conventional speed control apparatus for an electric motor.

The apparatus of FIG. 1 comprises: a micro-processor (CPU) 1; a data bus 2; a data bus control line 3 for transmitting data bus control signals including read signals, write signals, chip select signals, and address bus signals; a first application specific integrated circuit (ASIC) 5; a second ASIC 6; a digital signal processor (DSP) 7; an A/D converter 10 for converting an analog current detection signal 9 into a digital current detection signal; and a high speed clock generator (OSC) 11 for providing high speed clock signals with which the operations of the first ASIC 5, a second ASIC 6, DSP 7, and A/D converter 10 are synchronized.

In this apparatus, the micro-processor 1 carries out a generation of speed command, a rotation angle to speed transformation, a speed control, and a summing of an output of the speed control and a weight detection signal (which are carried out by the elements 57 to 60 in FIG. 1, respectively), and transmits a resulting torque command signal through the data bus 2 to the first and second ASICs 5 and 6.

The first ASIC 5 converts two phase pulse signal 4 corresponding to a rotation angle detection signal into a rotation angle information and transmits this rotation angle information to the micro-processor 1, carries out a part of a vector control processing (which is carried out by the element 56 in FIG. 1) by using the rotational angle information and a slip frequency given by the micro-processor 1, and outputs a current command phase reference signal to the second ASIC 6.

The DSP 7 carries out a remaining part of the vector control processing and a current control (which are carried out by the elements 55 and 56 in FIG. 1) by using the digital current detection signal and the current command phase reference signal obtained through the second ASIC 6 and the torque command signal from the micro-processor 1, and outputs a voltage command signal to the second ASIC 6.

The second ASIC 6 provides an interface function with respect to the DSP 7, and carries out a generation of a carrier triangular wave and a comparison of this carrier triangular wave and the voltage command signal (which are carried out by the elements 53 and 54 in FIG. 1), and outputs a base signal to be supplied to a base driver unit (the element 52 in FIG. 1) associated with an inverter (the element 44 in FIG. 1).

Figure 3:
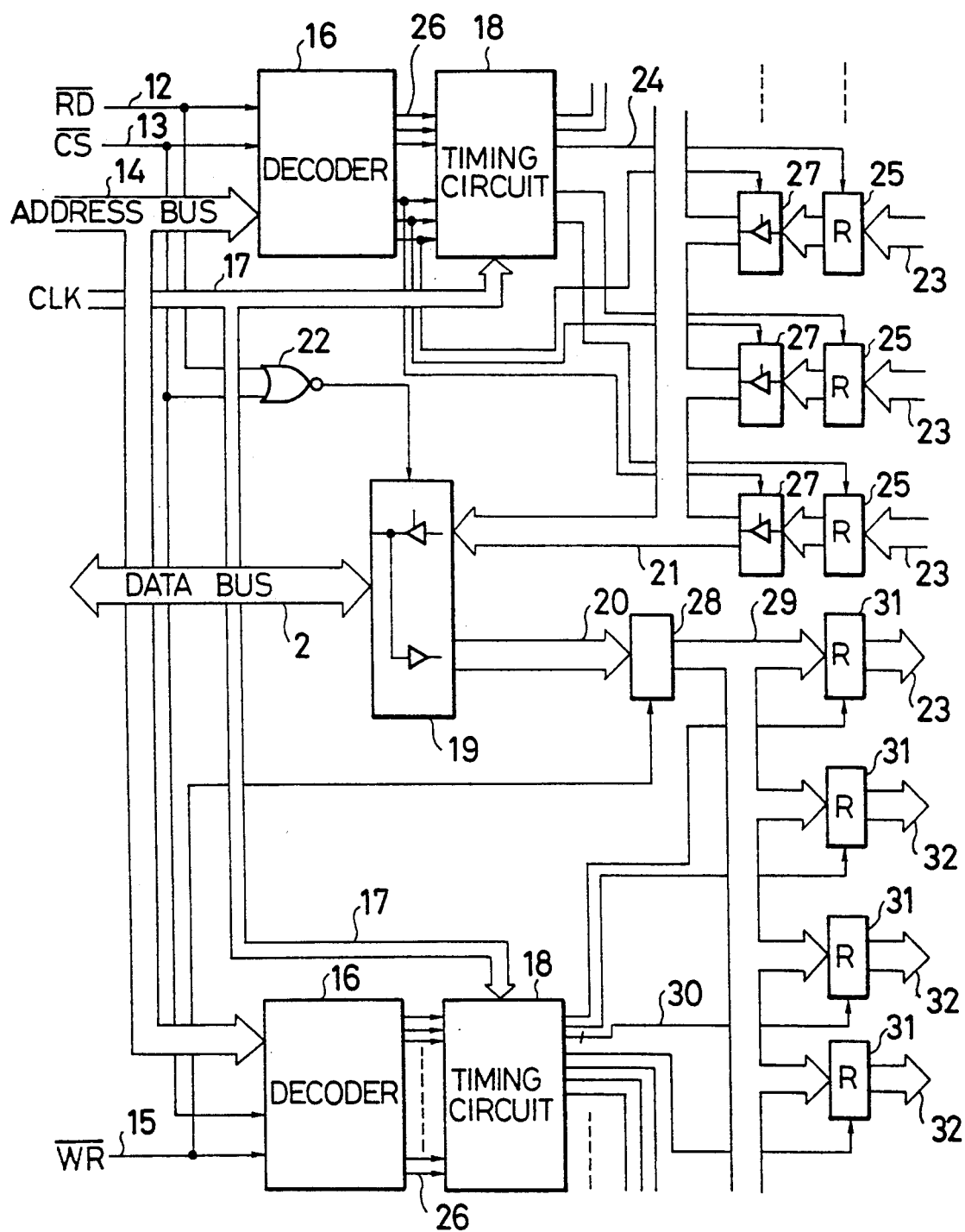
FIG. 3 is a detail block diagram of an interface portion of an ASIC (application specific integrated circuit) in the apparatus of FIG. 2.

Referring now to FIG. 3, a data interface between the micro-processor 1 and the second ASIC 6 will be described in detail.

FIG. 3 shows an interface portion of the second ASIC 6 which includes: decoders 16 for decoding the data bus control signals including the read signals (RD) 12, chip selection signals (CS) 13, address bus signals 14 and write signals (WR) 15, in order to obtain access signals 26; timing circuits 18 for controlling timing of the access signals 26 by using timing clock signals (CLK) 17 obtained by a frequency division or a frequency multiplication of the high speed clock signals generated by the high speed clock generator 11; a data bus interface buffer circuit 19 formed by a large capacity output tri-state buffer and an input buffer for inputting data from the data bus 2 to a first input data bus 20 and outputting data from an output data bus 21 to the data bus 2; an AND gate 22 for taking a logical multiplication of the read signals 12 and the chip select signals 13 according to which a gate of the output tri-state buffer of the data bus interface buffer circuit 19 is controlled; output data registers (R) 25 for temporarily storing output data 23 according to the output timing signal 24 outputted by the timing circuits 18; tristate buffers 27 for outputting the output data in the output data registers 25 to the output data bus 21 by opening its gate according to the access signals 26; a first input register 28 for temporarily storing the input data from the first input data bus 20 according to the write signals 15 and transmitting the input data to a second input data bus 29; and second input registers 31 for temporarily storing the input data from the second input data bus 29 according to the input timing signals 30 of the timing circuits 18 and transmitting the input data to ASIC data bus 32.

In this configuration, because of a double data bus structure formed by the first and second input data buses 20 and 29 connected through a first input register 28 which is operated by the write signals 15 alone, the accidental failure of the transmission of the data from the data bus 2 to the second input registers 31 due to a mismatch between the timings of the data from the data bus 2 and the output of the timing circuits 18 caused by the delays in the decoders 16 and the timing circuits 18 can effectively be prevented.

Figure 4:
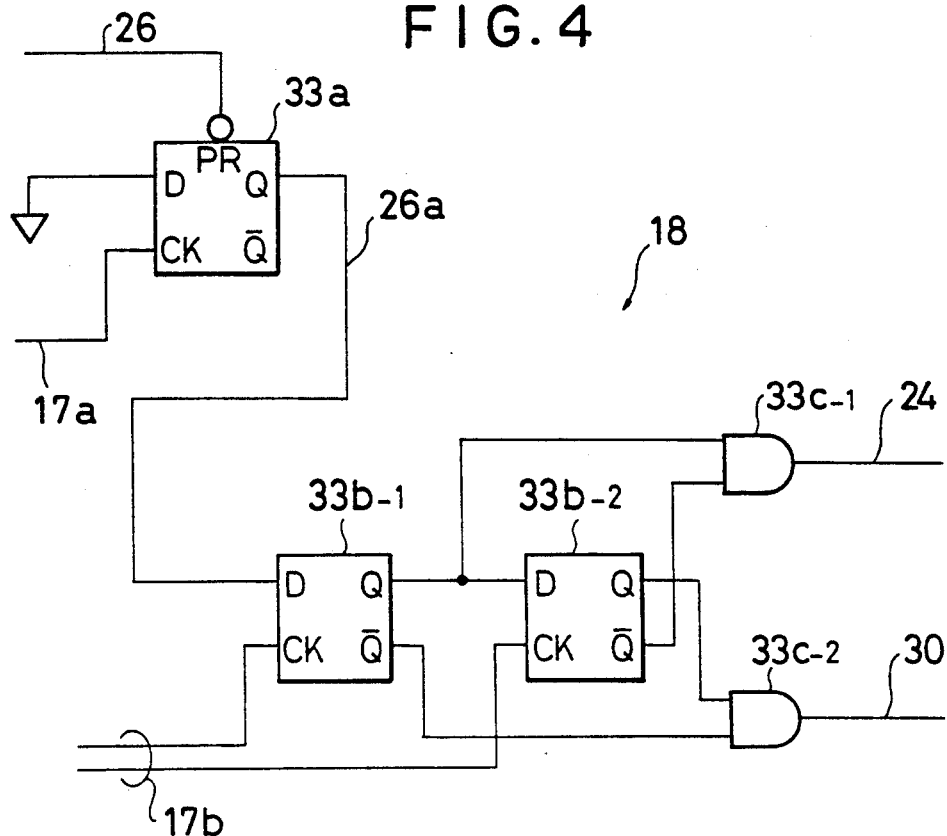
FIG. 4 is a detail block diagram of a timing circuit in the interface portion of FIG. 3.

Referring now to FIG. 4, a detail configuration of the timing circuits 18 will be described.

As shown in FIG. 4, each of the timing circuits 18 comprises; a first D-Q flip flop 33a with a pre-set which receives the access signals 26 as a pre-set, and timing clocks 17a which are either clocks synchronized with the period of updating data or higher speed clocks obtained from these clocks by frequency multiplication; a second D-Q flip flop 33b-1 which receives a Q terminal output 26a of the first D-Q flip flop 33a and timing clocks 17b which are either the same as the timing clocks 17a or higher speed clocks; a third D-Q flip flop 33b-2 which receives a Q terminal output of the second D-Q flip flop 33b-1 and the timing clocks 17b; a first AND gate 33c-1 which takes a logical multiplication of a Q terminal output of the second D-Q flip flop 33b-1 and a $\overline{Q}$ terminal output of the third D-Q flip flop 33b-2, and outputs the output timing signals 24; and a second AND gate 33c-2 which takes a logical multiplication of a Q terminal output of the third D-Q flip flop 33b-2 and a $\overline{Q}$ terminal output of the second D-Q flip flop 33b-1, and outputs the input timing signals 30.

Figure 5:
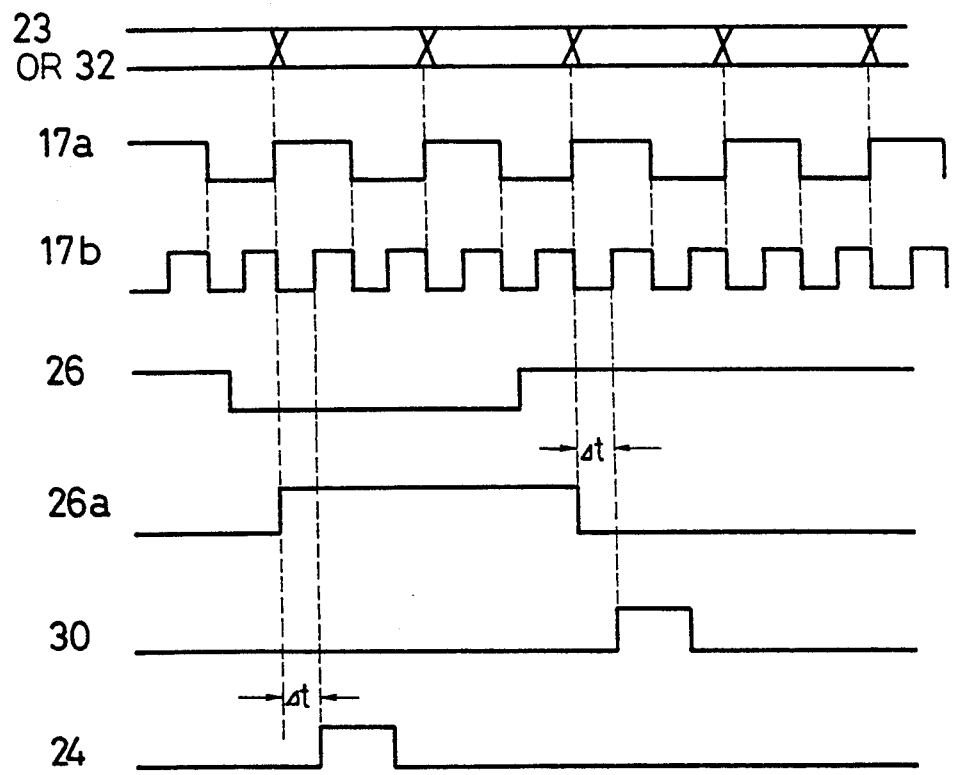
FIG. 5 is a timing chart for signals in the timing circuit of FIG. 4.

With this configuration, the Q terminal output 26a of the first D-Q flip flop 33a is a signal which is synchronized with a rise of an earliest timing clocks 17a after a rise or fall of an access signal 26, and is entered into a differentiating circuit configuration formed by the second and third D-Q flip flops 33b-1 and 33b-2 and the first and second AND gates 33c-1 and 33c-2 such that the output and input timing signals 24 and 30 which are synchronized with the rise and the fall of the Q terminal output 26a of the first D-Q flip flop 33a are outputted as shown in the timing chart of FIG. 5. In the timing chart of FIG. 5, the timing labelled 23 or 32 represents a timing for updating data in a digital processing unit for a label 23, and a timing in which data must be stable in order to execute a digital processing for a label 32. When the data access from the micro-processor 1 overlaps with this timing, the normal data transmission cannot be carried out successfully. FIG. 5 shows that the output and input timing signals 24 and 30 are in enable states at timings different from the timing of the timing 23 or 32.

Moreover, by inserting a shift register between the first and second D-Q flip flops 33a and 33b-1, a delay time Δt shown in FIG. 5 can be changed. Thus, the timings of the output and input timing signals 24 and 30 can be adjusted appropriately by considering the various different timing for the timing 23 or 32, without changing the timing clocks 17a.

Thus, according to this embodiment, the data transmission between the micro-processor 1 and the first and second ASICs 5 and 6 can be achieved without a specialized software or a complicated interface circuit, because the first and second ASICs 5 and 6 in this embodiment can effectively be regarded as peripheral elements of the micro-processor 1 to which certain regions of the address space are allocated. In other words, the timing circuits 18 controls the timing of the access signal from the micro-processor 1 according to the timing clocks of the digital processing system, and the output and input timing signals 24 and 30 are provided such that the data transmission is carried out at timings different from the timing of updating data in the digital processing system. Therefore, the data from the micro-processor 1 are transmitted to the high speed digital processing system in synchronization with the data access signals which are obtained from the data access signals from the micro-processor 1 by using the high speed clocks of the high speed digital processing system, so that the fully digital speed control apparatus can be realized without the conventional problems associated with such a configuration.

It is to be noted that the effect similar to that described for the above embodiment can also be obtained by replacing the timing circuits 18 of FIG. 4 by a synchronization circuits for synchronizing the access signals from the micro-processor 1 with the timing clocks of the digital processing system, and providing the outputs of this synchronization circuit to the interface registers.

Figure 6:
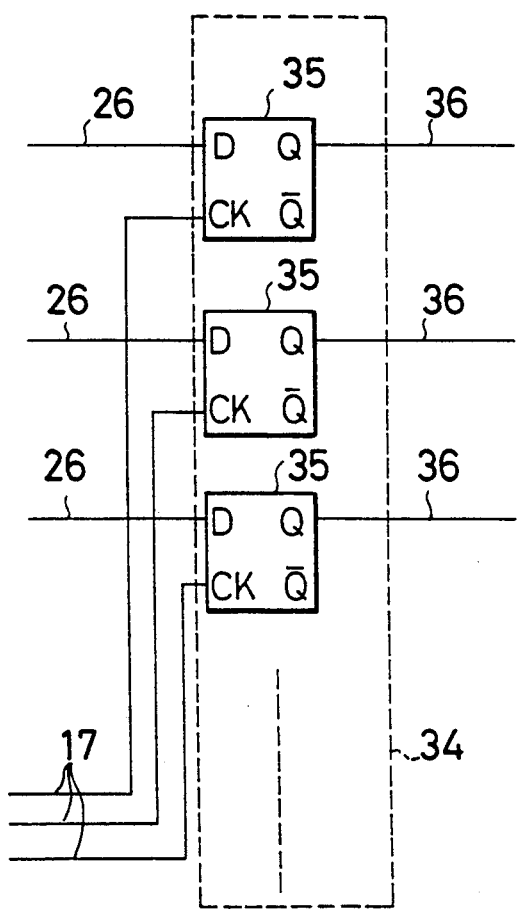
FIG. 6 is a detail block diagram of a synchronization circuit to be used instead of the timing circuit of FIG. 4 in one variation of the embodiment of FIG. 2.
Figure 7:
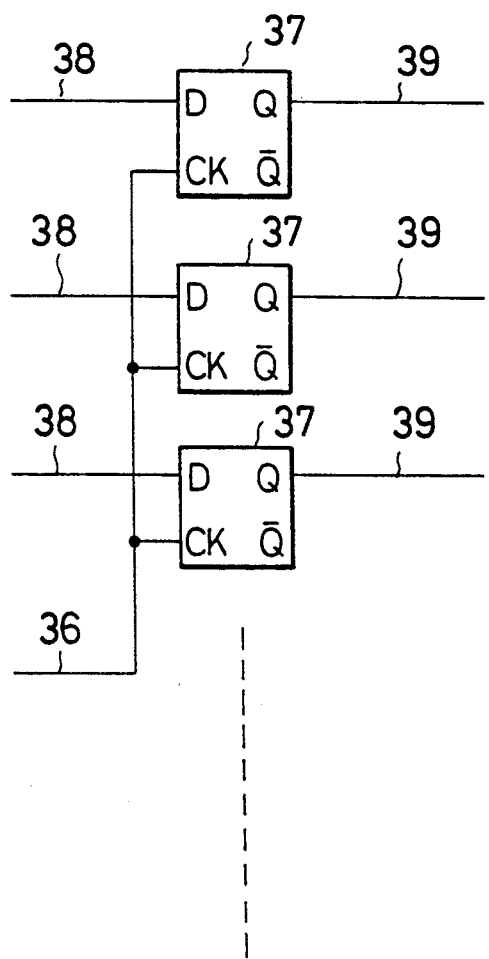
FIG. 7 is a detail block diagram of an interface registers to be used in the variation using the synchronization circuit of FIG. 6.

More specifically, each of the timing circuits 18 in the above embodiment can be replaced by a synchronization circuit 34 shown in FIG. 6. This synchronization circuit 34 comprises a plurality of D-Q flip flops 35, each of which receives the access signals 26 from the decoder 16 and the timing clock signals 17, and outputs timing signals 36 as its Q terminal output which are to be given to the interface registers. In this case, each of the interface registers can also be formed by a plurality of D-Q flip flops 37 as shown in FIG. 7, where each D-Q flip flop 37 receives the timing signals 36 from the synchronization circuit 34 and input signals 38, and outputs output signals 39 as its Q terminal output.

However, it is also pointed out that in this case, the timing clocks for synchronization have to be chosen by considering the variation of the delay time due to the D-Q flip flops 35 of the synchronization circuit 34, especially when the data to which the access is made by the micro-processor 1 are in a state of being processed by a high speed processing in the digital processing system. For this reason, the designing of a suitable frequency division counter for generating the timing clocks can be rather difficult in this case.

Note that in the above embodiment using the timing circuits 18, such a problem related to the designing of the frequency division counter can be avoided, because there is no need to change the timing clocks as the timings of the timing signals 24 and 30 can easily be changed by inserting the shift registers in the timing circuits 18, and the timing clocks provided to the timing circuits 18 are higher speed clocks than the timing clocks to which the processing in the digital processing system is synchronized, as described in detail above.

It is to be noted that many modifications and variations of the above embodiments may be made without departing from the novel and advantageous features of the present invention. Accordingly, all such modifications and variations are intended to be included within the scope of the appended claims.

What is claimed is:

1. An apparatus for digitally controlling a speed of an electric motor, comprising:
   micro-processor means for carrying out low speed control processings at low speed timings;
   high speed digital processor means for carrying out high speed control processings at high speed timings faster than the low speed timings, the high speed digital processor means including, interface register means for interfacing data transmission between the micro-processor means and the high speed digital processor means, where data to be interfaced by the interface register means contain no information concerning timings of the data transmission through the interface register means; and timing circuit means for receiving access signals from the micro-processor means, and producing timing signals based on the high speed timings by using the access signals where the timing signals control the timings of the data transmission through the interface register means; and means for controlling the speed of the electric motor according to the low speed control processings and the high speed control processings.

2. The apparatus of claim 1, wherein the timing circuit means controls the timings of the data transmission through the interface register means to be different from timings at which data are updated in the high speed digital processor means.

3. The apparatus of claim 1, wherein the interface register means receives data from the micro-processor means at timings of the access signals from the micro-processor means, and outputs said data to the high speed digital processor means at timings of the timing signals from the timing circuit means.

4. The apparatus of claim 1, wherein the interface register means receives data from the high speed digital processor means at timings of the timing signals from the timing circuit means, and outputs said data to the micro-processor means at timings of the access signals from the micro-processor means.

5. The apparatus of claim 1, wherein the timing circuit means comprises:

a D-Q flip flop circuit with a pre-set which receives the access signals, and produces a Q terminal output at a timing synchronized with the high speed timings; and a differentiating circuit which receives the Q terminal output of the D-Q flip flop circuit, and produces the timing signals.

6. The apparatus of claim 5, wherein the timing circuit means further comprises shift register means inserted between the D-Q flip flop circuit and the differentiating circuit.

7. The apparatus of claim 1, wherein the timing circuit means utilizes timing obtained by frequency multiplication of the high speed timings.

8. The apparatus of claim 1, wherein the high speed digital processor means includes at least one application specific integrated circuit.

* * * * *